(12) United States Patent
Bird

(10) Patent No.: US 7,852,873 B2
(45) Date of Patent: Dec. 14, 2010

(54) UNIVERSAL COMPUTER MANAGEMENT INTERFACE

(75) Inventor: Randall R. Bird, Newport Beach, CA (US)

(73) Assignee: Lantronix, Inc., Irvine, CA (US)

( * ) Notice: Subject to any disclaimer, the term of this patent is extended or adjusted under 35 U.S.C. 154(b) by 324 days.

(21) Appl. No.: 11/366,310

(22) Filed: Mar. 1, 2006

(65) Prior Publication Data
US 2007/0206630 A1 Sep. 6, 2007

(51) Int. Cl.
H04L 12/66 (2006.01)
G06F 15/173 (2006.01)

(52) U.S. Cl. ...................... 370/463; 709/223

(58) Field of Classification Search .................. 370/463
See application file for complete search history.

(56) References Cited

U.S. PATENT DOCUMENTS

| | | | |
|---|---|---|---|
| 5,732,212 A | 3/1998 | Perholtz et al. | |
| 6,304,895 B1 | 10/2001 | Schneider et al. | |
| 6,345,323 B1 | 2/2002 | Beasley et al. | |
| 6,378,009 B1 | 4/2002 | Pinkston, II et al. | |
| 6,539,418 B2 | 3/2003 | Schneider et al. | |
| 6,633,905 B1 * | 10/2003 | Anderson et al. | 709/219 |
| 6,681,250 B1 | 1/2004 | Thomas et al. | |
| 6,701,380 B2 | 3/2004 | Schneider et al. | |
| 6,963,589 B1 * | 11/2005 | Sugata et al. | 370/535 |
| 7,415,552 B2 * | 8/2008 | Chen | 710/73 |
| 2004/0075589 A1 * | 4/2004 | Wang et al. | 341/22 |
| 2005/0125519 A1 * | 6/2005 | Yang et al. | 709/223 |
| 2005/0201404 A1 * | 9/2005 | Steinhart et al. | 370/419 |
| 2005/0204026 A1 * | 9/2005 | Hoerl | 709/223 |
| 2005/0204082 A1 * | 9/2005 | Thomas et al. | 710/100 |
| 2006/0059456 A1 * | 3/2006 | Baba | 717/104 |
| 2006/0107061 A1 * | 5/2006 | Holovacs | 713/182 |
| 2006/0132285 A1 * | 6/2006 | Atkinson et al. | 340/5.61 |
| 2006/0215687 A1 * | 9/2006 | Lee et al. | 370/463 |
| 2006/0267936 A1 * | 11/2006 | Hoerl et al. | 345/158 |
| 2007/0079348 A1 * | 4/2007 | King et al. | 725/117 |
| 2007/0115992 A1 * | 5/2007 | Weinstock et al. | 370/392 |
| 2007/0174526 A1 * | 7/2007 | Blackwell et al. | 710/73 |
| 2007/0223520 A1 * | 9/2007 | Diab | 370/463 |

(Continued)

OTHER PUBLICATIONS

"SecureLinx SLK Remote KVM via IP," Product Data Sheet, Lantronix (Irvine, CA), (Mar. 1, 2005).

(Continued)

*Primary Examiner*—Anh-Vu Ly
(74) *Attorney, Agent, or Firm*—Hani Z. Sayed; Rutan & Tucker, LLP

(57) ABSTRACT

An integrated computer management apparatus allowing a networked administrator to manage a computer via multiple connection types and protocols. A preferred embodiment of the device has a network connection for the administrative users, coupled via an internal Ethernet switch and a processor to keyboard-video-mouse, serial, and Ethernet computer connections. Depending on hardware characteristics, operational status, OS, and administrator preferences any of these may be used to provide remote computer system management functions. Software running on the processor can provide direct logical connection between the remote administrator and a management port; may serve web pages graphically interpreting data gleaned from one or more of the connections; can provide protocol translation or proxy services; or locally execute an intelligent management agent. The device can be physically small enough to be supported by its connecting cables, and receives power from the attached computer.

29 Claims, 10 Drawing Sheets

U.S. PATENT DOCUMENTS

2010/0050226 A1* 2/2010 King et al. .................. 725/149

OTHER PUBLICATIONS

"Dominion KX101," Product Data Sheet, Raritan (Somerset, NJ), (Mar. 1, 2005).

"Switch View IP," Product Data Sheet, Avocent (Huntsville, AL), (Mar. 1, 2003).

"AlterPath KVM/net," Product Data Sheet, Cyclades (Fremont, CA), (Mar. 1, 2004).

* cited by examiner

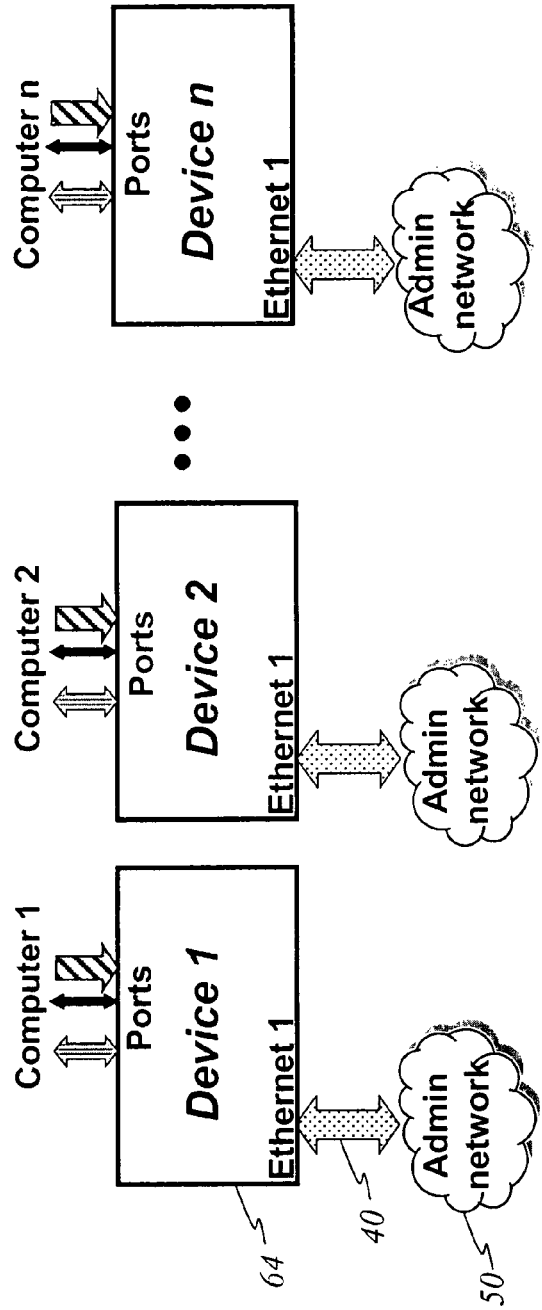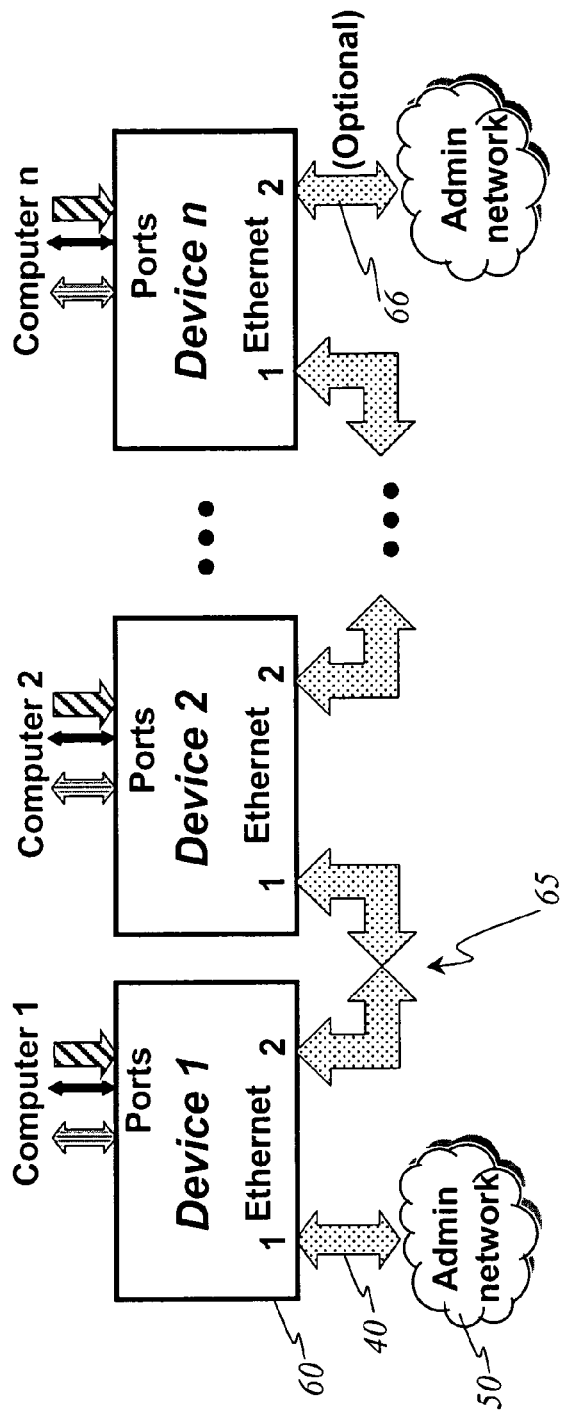
Fig. 6a. Prior art
Fig. 6b.

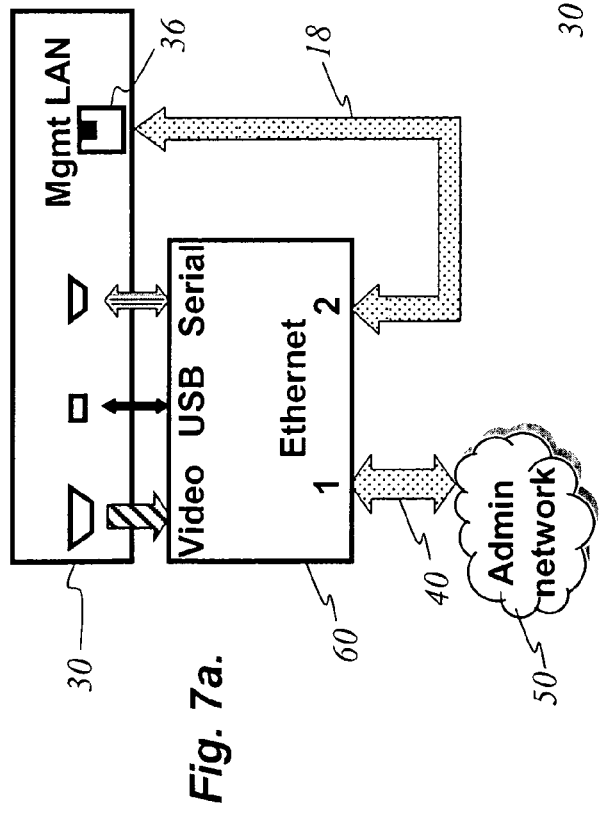
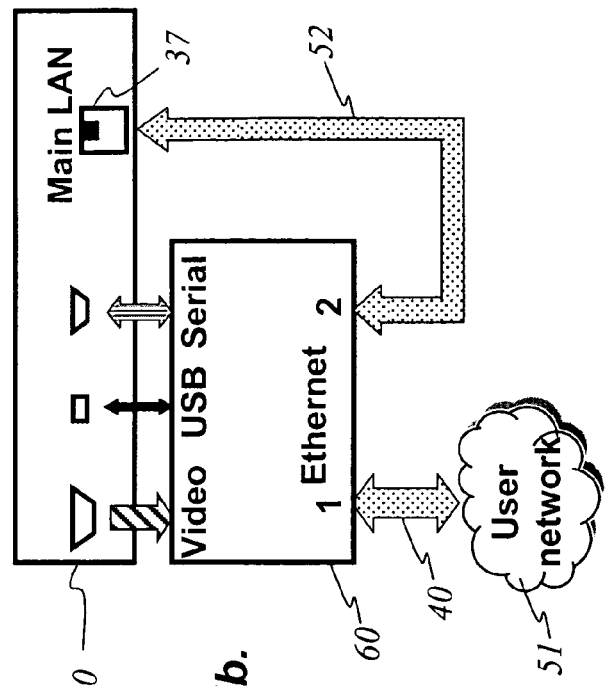

UNIVERSAL COMPUTER MANAGEMENT INTERFACE

FIELD OF INVENTION

The field of invention is remote management of computers via network connection.

BACKGROUND

As the number of computers in corporate networks has grown, along with the number of operating systems and applications running on those computers, the time and effort required to monitor the status of these complex hardware/software systems has increased commensurately. Hardware devices such as disk drives and power supplies are prone to failure, environmental conditions such as overheating can result in erratic operation, and software on many layers has a well-deserved reputation for becoming non-responsive or "hanging." Monitoring the status of a computer and taking action to recover from an abnormal condition is part of what is known as computer system management, and generally requires either human intervention by an administrator or, more recently, an intelligent software agent making decisions based on the same sort of inputs used by human administrators. If every computer had its own peripherals of monitor, keyboard, and mouse in order for system managers (human or automated) to determine its health and take corrective action when needed, the cost, space, and power requirements for a large number of computers could be enormous. In addition, the manpower requirements for operating such an inefficient architecture would add significant ongoing cost to the organization.

Hence, computer manufacturers early on began to incorporate devices and methods to make management of their equipment easier and more scalable. Software suppliers such as Microsoft also have developed and refined tools for this purpose. Because of the many potential failure modes and individual system administrators' preferences for how to deal with their configurations a plethora of these system management mechanisms exist, but generally they can be classified into two categories: in-band and out-of-band management. In-band management relies upon fully functional hardware, operating system, and network connection; it allows administrators in an enterprise environment to perform day-to-day operation of dozens to thousands of computers from one or more management consoles. Typical tasks performed with in-band management tools include user/account administration and reporting, backup and restore operations, usage measurement and analysis, application software loading and execution, operating system patch installation, etc. While routine health monitoring can be performed with in-band management tools, if one of the tools' underlying software or hardware components fails then that communication path may be rendered nonoperational. A separate, "out-of-band," connection is required in order to diagnose the problem and attempt to return the system to a fully operational condition. The general area of the present invention is this out-of-band ("OOB") management, and specifically relates to integrating a number of different out-of-band management techniques into one device.

Out-of-band management interfaces to computers are implemented in a number of different ways. If the computer's CPU and operating system are functional to some degree, one of the serial ports (COM ports) may be used to communicate with management services supported by a subset of the operating system. Microsoft's Emergency Management Services ("EMS") is an example of this. Rather than using a full graphical user interface (GUI) operating over the network connection, which requires many different system resources to be functioning correctly, EMS uses a simple text command line via serial port to perform low-level diagnostic and corrective operations.

Another management technique which is becoming common is to embed a small service processor on the computer's main board. This service processor is independent of the main CPU and hence can continue to operate even when there is a hardware or software failure that disables the main CPU. The service processor (also known as a Baseboard Management Controller) can have a number of inputs for sensors monitoring conditions such as temperature and fan speed, and can have the ability to restart the main CPU or even cycle power to the computer. In order to ensure full operation of the service processor even when the main CPU and/or its primary network connection are down, the service processor typically has its own physical interface, either a serial port or a network (e.g. Ethernet) connection independent of the main network. The service processor may also share the main network connection in what is known as a "sideband," if the hardware is designed for it. Communication with an embedded service processor has traditionally involved proprietary, manufacturer-specific protocols such as HP® Integrated Lights Out (iLO) or Sun® Advanced Lights Out Manager (ALOM), but standardization on a protocol known as Intelligent Platform Management Interface (IPMI) is underway. A third fundamental method of OOB management is known as digital KVM (Keyboard, Video, Mouse). With this, the computer's keyboard, mouse, and video monitor ports are used for communication independent of the main network connection, just as they do when a human being is sitting in front of those peripherals. A (hardware) device can capture the video output intended for a monitor, digitize it, and make it available over a network connection to a remotely located system administrator. The same device can emulate the keyboard and mouse signals (either in native PS/2 format or via Universal Serial Bus (USB)) that the computer expects to see on those inputs, allowing the remote administrator to interact with the computer just as if he had a physically connected keyboard, mouse, and monitor. Such KVM devices are commercially available, either with individual computer connections or combined with an analog KVM switch so that multiple computer KVM interfaces may share one network connection.

To summarize, out-of-band system management may take place via three types of hardware connection: network, serial, or KVM. Differing levels of management software communicate over one of these hardware interfaces either with the main CPU or an independent service processor. FIG. 1 shows the various connections and their relationship to system operational state. In locations with a large number of computers, integrating these disparate interfaces can require a significant management infrastructure of cabling and equipment. Ethernet switches are used to aggregate network connections; each computer using a management LAN connection (almost always Ethernet) will have cables running from centralized data center switches to both the main LAN port (for application communication with the outside world) and to the dedicated management LAN port. If serial OOB management is to be used, terminal concentrators (also known as terminal servers or console servers) combine a number of serial connections and make them available remotely via a network connection. This requires another cable from the terminal concentrator to the computer's COM port or dedicated serial management port. For KVM management, the situation is even more complicated due to the limited distance that the keyboard, mouse, and video signals can travel. A transceiver unit (about the size of a small cell phone) connects via short cables to the computer's keyboard, mouse, and video ports. The transceiver contains circuitry that extends these connections over a distance of cable ranging from 10 m to 100 m, depending on manufacturer, to a KVM switch chassis. This KVM switch aggregates a number of these connections and makes access to them available over a network connection.

Hence, to cover all OOB management interface possibilities, each managed computer requires three separate cables, connecting to four types of equipment: Ethernet switch, terminal concentrator, KVM transceiver dongle, and KVM switch. FIG. 2 illustrates this prior art configuration. Outside of the transceiver, all of these units are chasses which take up rack space and require AC power connections in data centers where both are at a premium. And in large data centers, keeping track of all of the cables can be a significant task in and of itself. On a hardware level, a device that reduces the number of equipment types by aggregating all of the various computer system management connections onto one administrative user connection would have considerable value over prior art in solving these problems. Ideally, the device would be compact in size, not requiring rack space, and low in power consumption.

Once the hardware connections are taken care of, the actual system management operations needing to performed by administrators can be time-consuming and hence expensive. Typical management functions are described using the acronym MILARRS in U.S. patent application Ser. No. 11/031,643 entitled "MILARRS Systems and Methods," filed Jan. 7, 2005, the entire disclosure of which is incorporated herein by reference. MILARRS stands for Monitoring the state of the system for an administrator; Inventory the system's sub-systems, components, or assets; Logging data or events generated by the system; Alerting an administrator of system state or taking action based defined rules; Recovering the system if it fails or shuts down; Reporting device information or diagnostics to an administrator; and Securing the system and its assets from threats and risks. This and all other referenced extrinsic materials are incorporated herein by reference in their entirety. Where a definition or use of a term in an incorporated reference is inconsistent or contrary to the definition of that term provided herein, the definition of that term provided herein applies and the definition of that term in the reference does not apply.

The mix of prior art management equipment described above—network switches, terminal concentrators, KVM switches, etc.—can perform some of these functions, but each does so in a different way. Consider as a typical example a server where day-to-day management activity takes place via a KVM switch, with an administrator running a KVM client application on their management console. If the operating system should appear nonresponsive, the administrator would need to run a "telnet" application to try to communicate with the server via serial port connected to a terminal concentrator chassis. And as a last resort, running an IPMI client application could be needed to remotely reset power to the computer. Keeping track of which computer is being managed by what administrative application using which interface chassis at what network address and port number can be enormously time-consuming and expensive, particularly when configurations are changing rapidly. And this heterogeneous and ever-changing environment makes it difficult to automate the computer system management process by using software agents to reduce personnel costs.

A device which integrates all of the various connections required for computer system management could have a single network address, through which any management operation could be performed—no sorting out an intermediate layer of multiple single-interface chasses, each of which carries its own address. Through that single address, a common application interface could be presented to the remotely connected human or mechanized system administrators. With an embedded processing element, the device could also locally automate various management functions, reducing the workload on those administration resources.

SUMMARY OF THE INVENTION

The present invention provides methods and apparatus for interfacing a computer's keyboard/video/mouse, serial, and/or network management LAN ports to one or more administration network ports. In a preferred class of implementations, referenced herein from time to time as a Universal Computer Management Interface device, an internal processor running appropriate software allows a user (human or automated) connected over the network to access any or all of the computer management connections using standard tools such as a web browser. The processor can also execute scripts or otherwise make decisions based upon the data coming from those connections. Unlike prior art devices such as KVM extenders or terminal concentrators that can also perform some of these functions, the present invention incorporates an internal Ethernet packet forwarding functioniality, and the new device has low enough power requirements to be powered from the attached computer rather than an external AC-DC converter.

In one aspect of preferred embodiments, the device has two external Ethernet ports, with one available for the administrative network connection and one available for connection to a computer's dedicated LAN management port. Internally, both ports are connected with each other and the CPU using a hardware switch, allowing wire speed data transfer among all three. Prior art devices such as the commercially available SLK1 from Lantronix of Irvine, Calif., Dominion KX101 from Raritan Corp. of Somerset, N.J., or Switchview IP from Avocent Corp. of Huntsville, Ala. lack the second Ethernet port and hence cannot aggregate a LAN management port with the other OOB management interfaces.

If a particular computer does not have a LAN management port, an alternative use for the second Ethernet port is to provide for daisy-chaining the devices. Daisy-chaining refers to connection from device to device to device, with only the end of the chain being connected to the outside network, as opposed to the more typical star cabling configuration where each device individually physically connects to the outside network. FIGS. 6a and 6b show the difference in cabling topologies. U.S. patent application Ser. No. 11/273,791 entitled "Daisy Chaining Device Servers via Ethernet," filed Nov. 14, 2005, discloses a similar daisy-chaining applied to serial-to-Ethernet device servers, the entire disclosure of which is incorporated herein by reference. Daisy-chaining may be advantageous in minimizing cabling outside of a cabinet where a number of the Universal Computer Management Interface devices are located, as well as reducing the number of outside network switch connections required. Note that while the physical configuration of devices daisy-chained together may appear as a serial string of units, it is in the nature of Ethernet that logically to the outside network there is no difference between that and a star, or point-to-point, wiring configuration. If the devices are connected in a daisy-chain fashion, one embodiment could include an algorithm such as Spanning Tree to be incorporated in the switch function so that the daisy-chain could be connected in a loop or with two outside network connections for failure resiliency. In other embodiments, the internal Ethernet packet forwarding functionality could also be implemented as a hub function or a router function.

As used herein, the term "Ethernet packet forwarding functionality" means any functionality, which could be implemented in hardware, software, or combination of the two, which forwards Ethernet packets between or among a plurality of ports, regardless of whether the functionality is operating at a link layer (layer 2) or network layer (layer 3), or otherwise.

Additional contemplated embodiments include three or more external Ethernet ports so that both a management port and daisy-chain connection are concurrently available, or for redundant individual connections to the outside network. None of these capabilities are available with prior art KVM devices.

In another aspect of a preferred embodiment, the computer keyboard-video-mouse interface comprises a USB connection, plus an analog VGA video input. USB keyboard and mouse support has been present in computers for several years, and provides more efficient cabling than the older PS/2 interface. Another contemplated embodiment could utilize PS/2 connections for keyboard and mouse, for those older computers lacking USB ports. If the KVM interface is to be used for monitoring only and not for input to the computer, the "KM" connections could be dispensed with entirely. Analog VGA video is digitized by an Analog-to-Digital (A/D) converter IC internal to the Universal Computer Management Interface device before being digitally processed for transmission over the network. In another embodiment, the video comnection could be Digital Visual Interface (DVI) or High-Definition Multimedia Interface (HDMI), eliminating the need for an A/D converter.

In another aspect of a preferred embodiment, a serial RS-232 port is provided for connection to a computer COM port. Other contemplated embodiments of the current invention could include additional serial ports, for communication with peripherals such as remote-controlled power strips. Additional electrical standards for serial communications such as RS-422 or RS-485 could also be implemented.

In still another aspect of a preferred embodiment, the device draws 5 VDC power from the connected computer via the keyboard/mouse USB port; a second USB connection is provided in case a particular computer is incapable of supplying sufficient power over a single USB line. Other contemplated embodiments could use power from PS/2 keyboard/mouse connections, the video port, the serial port, the Ethernet port, or a DC power connector, either alone or in combination with one another.

As convenience is a key attribute of the device, size matters. Prior art devices for OOB management typically have either rackmount or tabletop metal chassis of 500 cm$^3$ or more and weighing upwards of 1 kg. Preferred embodiments would have a housing of less than 200 cm$^3$; and most preferred would be less than 100 cm$^3$ so that it could hang from an attached computer on its own cabling. The initial embodiment has a housing with a volume less than 75 cm$^3$ and weighs less than 500 g. Other contemplated embodiments could include mounting multiple units in a chassis or integrating hardware for attachment to rack rails.

The Universal Computer Management Interface device can advantageously incorporate an embedded processor running software that allows client users connecting over the network to exchange data with the attached computer via one or more of the management connections described above. Such software preferably implements standard networking protocols and applications including but not limited to IP, TCP, UDP, HTTP, SSL, SSH, and telnet as appropriate to the type of user-to-system connection desired. For example, a user may want to use a text command-line communication via the serial port; the device supports this via telnet or SSH servers, which in turn use TCP and IP protocols. In addition to facilitating direct data exchange between an administrator and the computer management ports, the internal processor can perform protocol conversions or execute proxy applications. For instance, an administrator desiring to utilize the KVM interface could communicate with the device over the network connection by using a web browser; the device has an internal web server that uses HTTP to present web pages derived from the digitized video input. In another example, the non-human-readable IPMI standard protocol, Microsoft Emergency Management Services Protocol, or a manufacturer-specific proprietary protocol communicated with the computer via the serial port could be translated into a graphical web page to be presented to the administrator network connection.

The existence of a processing element also allows the Universal Computer Management Interface to intelligently perform rule-based MILARRS functions. As one simple example, the device could be instructed to use its mouse emulation to move the cursor on a periodic basis, and examine the video to verify that the cursor has indeed moved. If it has not, the presumption would be that the attached system had hung, so the device could sent out an SMNP alert to the administration network and then reset the computer using IPMI over its serial port.

The foregoing are, of course, examples rather than limitations of the ways in which the programming of a Universal Computer Management Interface can allow a human or automated administrator remotely connected over the network to interact with the various computer management ports, or how it can reduce the burden on the remote administrator by intelligently acting on its own. Various objects, features, aspects and advantages of the present invention will become more apparent from the following detailed description of preferred embodiments of the invention, along with the accompanying drawings in which like numerals represent like components.

BRIEF DESCRIPTION OF DRAWINGS

FIG. 6a is a schematic of a prior art star cabling topology.

FIG. 6b is a schematic of a daisy-chained topology.

FIGS. 7a and 7b are schematics of a preferred Universal Computer Management Interface used in association with: (a) a dedicated management LAN port; and (b) a shared main LAN port, respectively.

DETAILED DESCRIPTION

Figure 1:
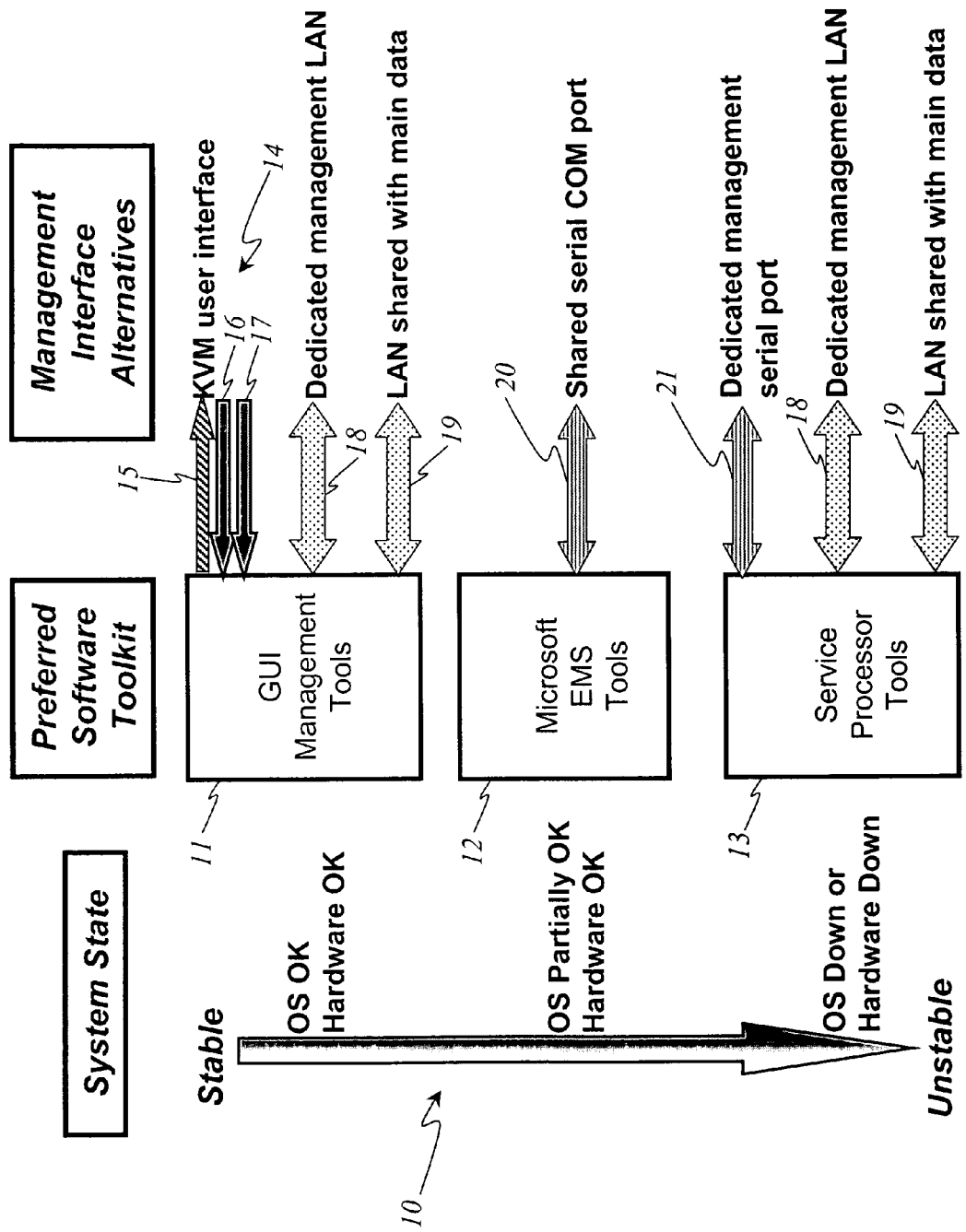
FIG. 1 is a schematic of various prior art management tools and their interfaces.

FIG. 1 provides an overview of the types of computer system management techniques and interfaces used when the computer is in various states of stability 10 ranging from operating system and hardware fully functional; through partial failure of the OS while hardware remains good; down to complete failure of either the OS or computer hardware. When the system (OS plus hardware) is operating normally, Graphical User Interface tools 11 provide the most powerful and easy-to-use functions. As all system facilities are available, administrators can utilize their choice of management hardware interfaces. Most common is the normal user KVM interface 14 consisting of video 15 output with keyboard 16 and mouse 17 inputs. For security purposes, many higher-end servers support a dedicated management LAN port 18 separate from the main (user data) LAN connection. However, this increases the installation complexity and hence many smaller facilities simply manage their computers via the main LAN connection 19, sharing management and user data on the same connection.

In the not-infrequent situation where some but not all of the operating system's components are dysfunctional, the complex GUI toolkit may be unavailable. For that situation, Microsoft provides what they call Emergency Management System tools 12. This toolkit requires minimum resources and can function in many situations where the GUI cannot. It provides much more limited text-based command line capability, principally designed to diagnose the fault and get the computer back up and running. One of the ways in which it minimizes the need for system resources is by utilizing a simple serial connection 20 on one of the COM ports. If user data also uses this COM port, there is a mechanism for it to be shared, with EMS taking it over under certain circumstances. Note that Unix and Linux administrators typically prefer text based command line utilities for their day-to-day work, so the serial connection 20 is used even when the system state is fully stable.

If the computer CPU itself has failed, or the OS is totally down, even the limited communication offered via the serial port is not available. In order to manage computers even under these conditions, independent service processor hardware running its own software toolkit 13 is provided in most higher-end servers. Depending upon manufacturer, a number of connectivity options are available for communication with the service processor. There may be a dedicated serial port 21, independent of the computer COM ports. Or the dedicated management LAN connection 18 can be used. And, with the latest hardware and software, a mechanism has been defined whereby the main LAN port 19 can have management data intended for the service processor interspersed with the user data, with the computer's internal Ethernet hardware capable of directing that data to the service processor even if the main CPU is disabled.

Figure 2:
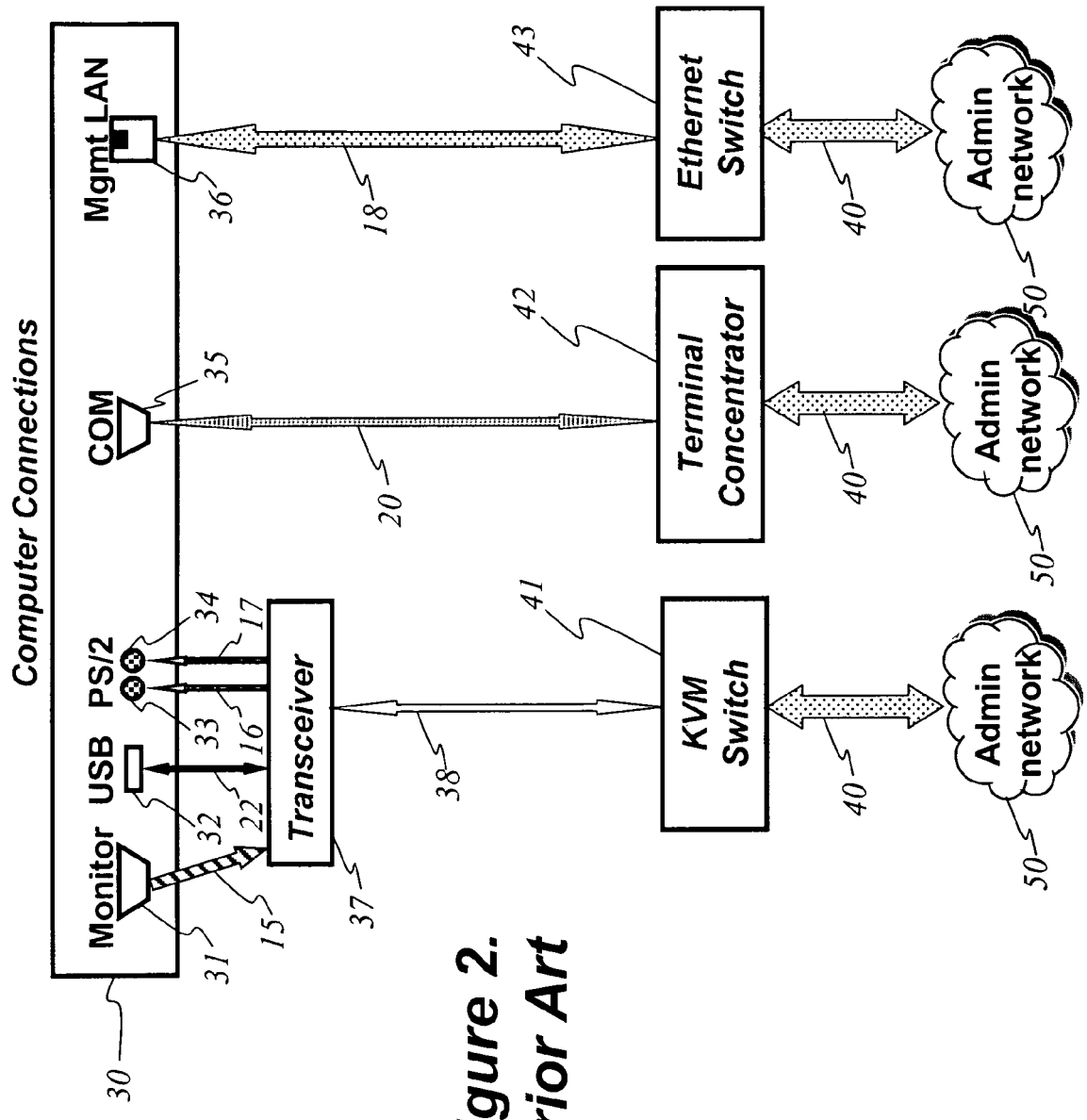
FIG. 2 is a schematic of prior art system management equipment and connections.

FIG. 2 shows a typical prior art solution to connecting these various interfaces. In order for system administrators to have access to a large number of computers, it is desirable to make any of the hardware interfaces described above available over a network. For security, the administrative management network 50 is generally separate from the primary user data network, although this need not always be the case. Equipment is needed to translate management data communicated via various hardware interfaces into network-based data packets. Usually, the connectors are mounted on the computer's back panel 30. In the simplest case, a dedicated management LAN port 36 is connected by an Ethernet cable 18 directly to an Ethernet switch 43, which is part of the Ethernet-connected 40 administrative network 50. A shared or dedicated serial port 35 has an RS-232 electrical connection which requires hardware translation and protocol conversion. A serial cable 20 connects the COM port to a piece of equipment known as a terminal concentrator or console server 42. This device provides serial connection to a number of computers, and converts the serial data stream from each into a form suitable for networking. The terminal concentrator has one or more Ethernet connections 40 to the administrative network 50.

The KVM interface is a bit more complex. The computer has a monitor port 31 for outputting video 15; the video is a low voltage level analog signal and operates at a very high speed hence is limited in the distance that can be supported. Older computers provide for what is well-known as the PS/2 interface for keyboard 33 and mouse 34 connections. The PS/2 interface is a low-level clocked serial protocol, not compatible with the COM serial port, and also quite limited in distance. Newer computers almost universally have one or more USB ports 32 which can support keyboards and mice via that connection. Prior art KVM products frequently consist of two pieces of equipment, a transceiver 37 that is capable of extending the distance from the keyboard, video, and mouse ports far enough to reach a KVM switch 41. Video 15 from the monitor port is amplified and turned into a differential signal in the transceiver, which combines it with USB data 22 or PS/2 keyboard 16 and mouse 17 data into a custom format running on KVM cable 38. The KVM switch 41 electrically interfaces to a number of these KVM cables, digitizes, formats, and packetizes the video and makes it available via one or more Ethernet connections 40 to the admin network 50. It receives and interprets packets from the network, and uses that information to emulate keyboard and mouse signals that it sends to the transceiver 37 for presentation to the respective ports. It thus "fools" the computer into thinking that a physical keyboard and mouse are directly connected, while in fact the administrator ultimately providing the keystrokes may be anywhere in the world with a network connection.

Figure 3:
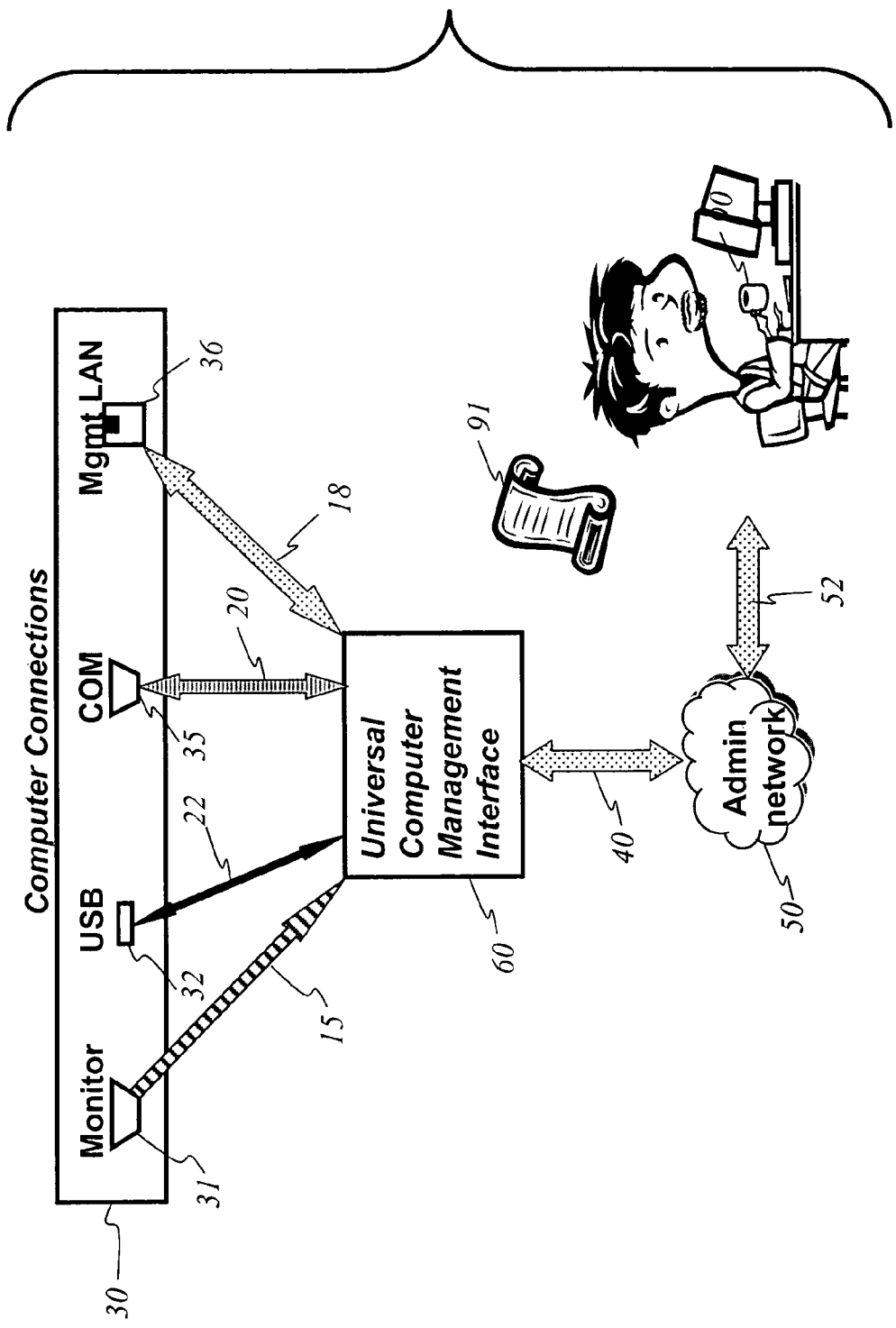
FIG. 3 is a schematic of connections between a preferred Universal Computer Management Interface and a typical computer, with a remote administrator connected.

Thus, the typical prior art solution requires three specialized pieces of equipment to handle all OOB management interfaces: KVM switch 41, KVM transceiver 37, and terminal concentrator 42. Additionally, three ports will be used on the Ethernet switch, hub, or router supporting the administrative network (for KVM switch, terminal concentrator, and direct management LAN connections.) FIG. 3 shows the improvement brought on by the present invention. As before, the computer back panel 30 with management LAN 36, serial COM 35, USB 32, and monitor video 31 ports is shown (keyboard and mouse support via USB is assumed, so PS/2 connections are not shown for simplification.) The present invention, Universal Computer Management Interface 60, has short cables for physically connecting to monitor, USB, and COM ports. It also has two RJ-45 Ethernet jacks, one of which connects via Ethernet cabling 40 to the administrative network 50, and one of which can be used to connect to the management LAN port 36. Instructions 91 provided to the user/administrator would explain the various ways in which the device can be connected. A system administrator 90 can be located anywhere in the world, connected by local or wide area network 52 in order to access any of the computer's management connections via the one device. It therefore replaces the three pieces of specialized equipment required by the prior art solution, and reduces the required number of administrative network switch ports from three to one.

Figure 4:
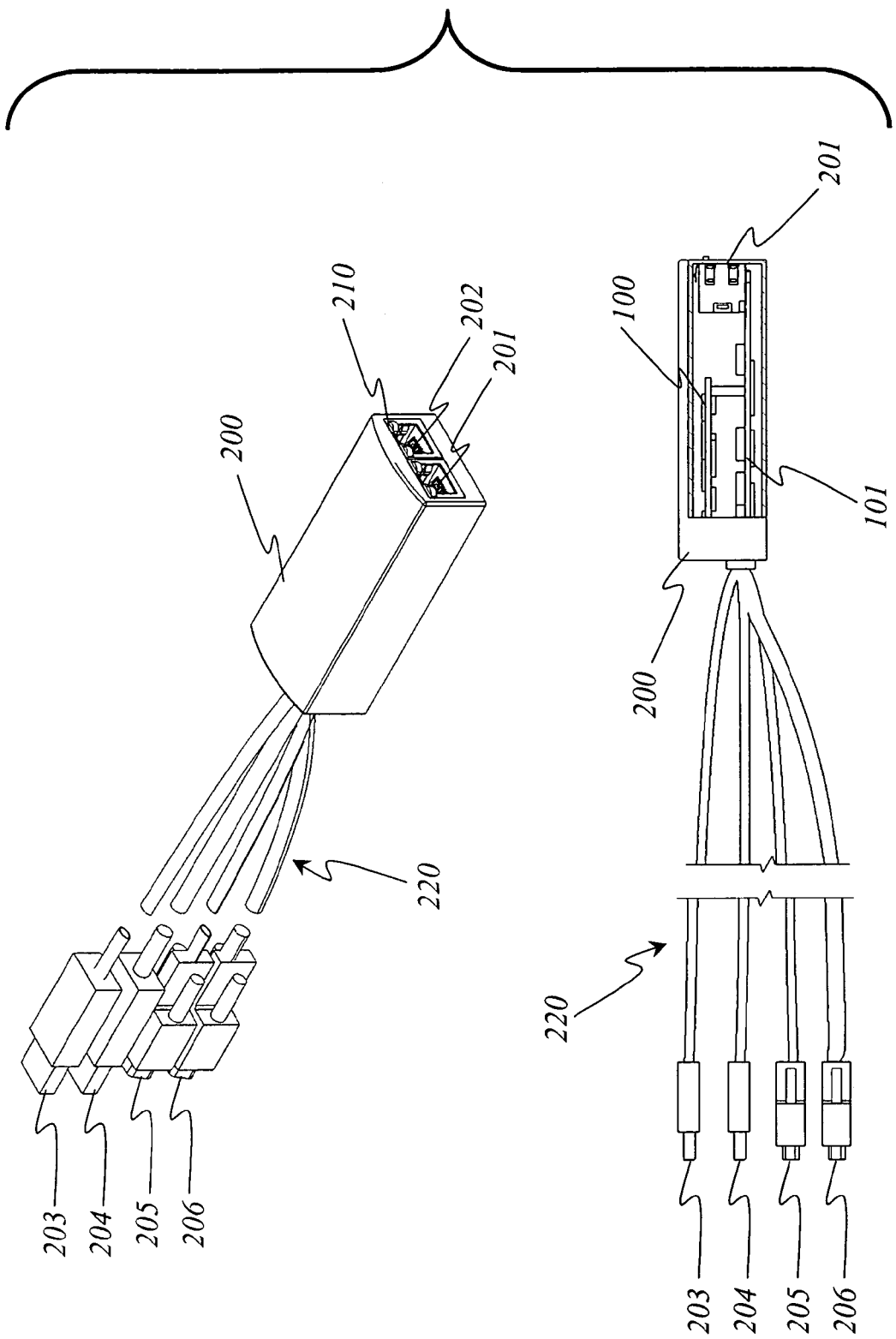
FIG. 4 are perspective and side views of the device of FIG. 3.
Figure 5:
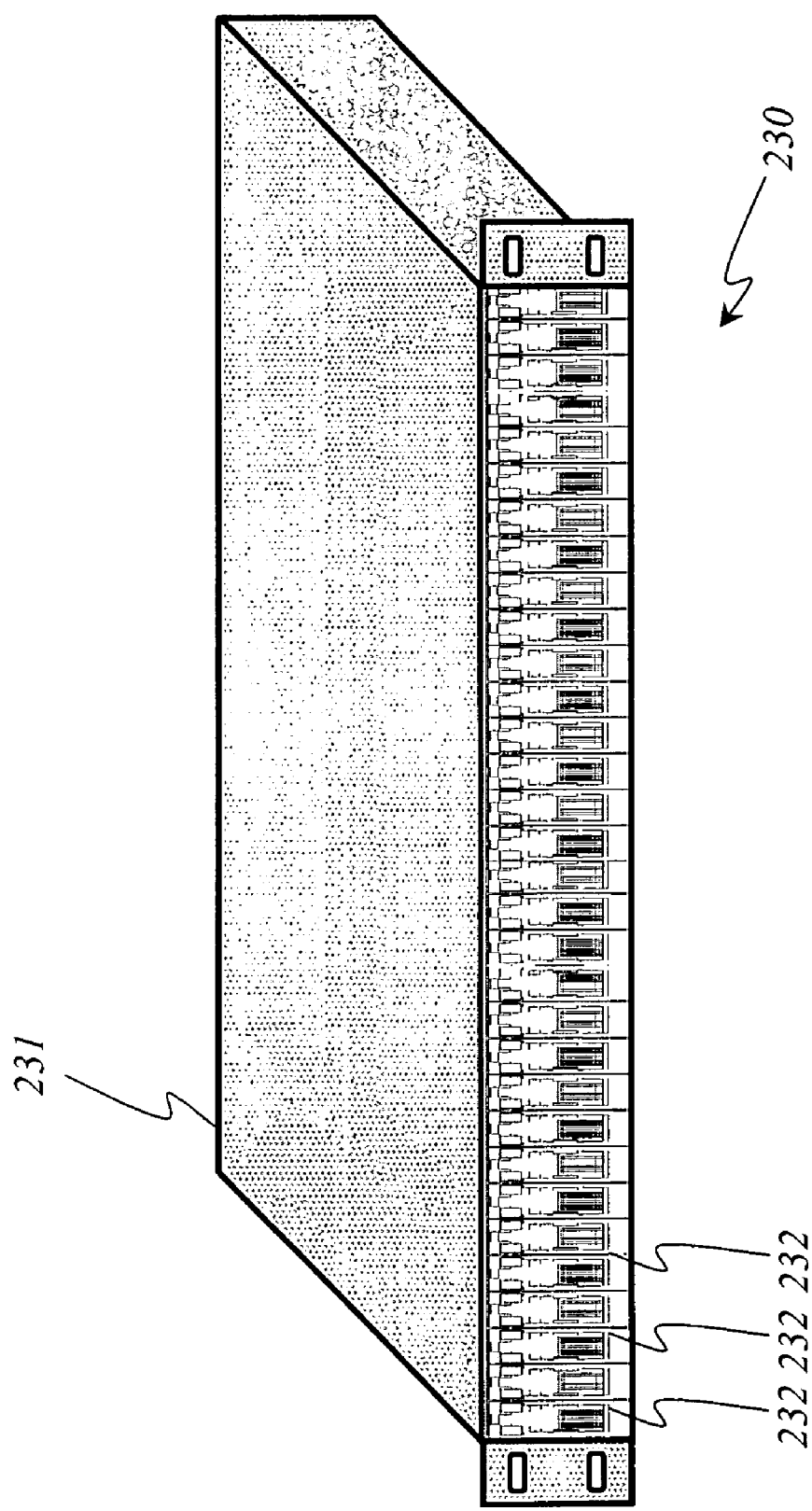
FIG. 5 is a perspective view of a multi-unit chassis embodiment of a Universal Computer Management Interface.

FIG. 4 shows perspective and cutaway side views of the preferred embodiment. The active elements are enclosed within a housing 200 (about 65 cm$^3$, roughly the size of a candy bar), to which is attached a strain-relieved cable bundle 220. The cables, approximately 30 cm long, are terminated in USB connectors 203 and 204, a DB-9 serial connector 205, and an HD-15 video connector 206 for connection to the appropriate jacks. Two RJ-45 jacks are provided, 201 and 202, for Ethernet LAN connections. In a preferred embodiment, the RJ-45 jacks include indicator LEDs 210 shoving network status. In the side view, the housing 200 is cut away to show the two circuit boards, a CPU board 100 and a peripheral interface board 101 to which the cable bundle 220 and Ethernet jacks 201 are internally attached. The whole device is light enough that the cable assembly can easily support its weight, but there is also provision for securing it inside a rack using cable ties. Other contemplated embodiments may have embedded connectors rather than an attached cable assembly, or have a cable assembly in lieu of the RJ-45 jacks. As server densities increase in the future, there is also a contemplated embodiment where the boards either with or without a housing are installed in clusters in a chassis. FIG. 5 shows such a multi-unit product 230, where a rack-mount chassis 231 contains multiple instances of the electronics 232.

Careful observation of FIG. 4 will reveal two of the inventive elements distinguishing the Universal Computer Management Interface device from prior art devices such as single-channel KVM extenders. First, the present invention draws power from the attached computer over one or both of the USB connections 203 and 204, eliminating the need for a bulky external power supply. Virtually all computers manufactured in this millennium have one or more USB connections, and the USB specification requires that each be capable of supplying a minimum of 500 mA at 5 VDC. As the components used in the initial implementation require slightly more power than this, a second USB connection is provided so as to acquire additional power. Future implementations utilizing less power will eventually eliminate the need for this second connection. While the preferred embodiment utilizes only power obtained via USB connections, other sources of power may be contemplated. The video port on modern computers is capable of supplying 5 VDC@300 mA, and certain serial ports carry power as well. For legacy computers lacking a USB connection, power could be drawn from the PS/2 keyboard and mouse interfaces. Or an auxiliary power supply may be provided, either Power Over Ethernet or an AC-DC converter plugged in to a DC power connector, so that if the computer's main power is lost and hence the USB unable to supply power, the unit will still be able to operate.

Second, there are two RJ-45 Ethernet jacks, which are coupled to one another and the device's processor via an internal Ethernet switch IC. Prior art devices have only had one external Ethernet port, which is used to connect the unit to the network. By providing a second Ethernet port, the present invention has several significant advantages as the connection can be used in a number of ways. FIG. 6a and FIG. 6b illustrate one of these advantages. In FIG. 6a, a prior art KVM extender device 64 has one Ethernet port which must connect 40 to the administration network 50 in order to access and use the device. Hence, each unit has its own connection, resulting in n devices requiring n cables and n switch ports on the admin network. In FIG. 6b, the present invention, the first Ethernet port 40 in the first device 60 goes to the admin network 50. The second Ethernet port can connect 65 to the first Ethernet port in the next device and so on through n devices, in what is called a "daisy-chain." Since the larger site configurations entail putting many servers in one rack, all of the Universal Computer Management Interface units attached to those servers within a rack could be daisy-chained together with short cables, reducing the number of network cabling connections outside the rack (and network switch ports) to one. For redundancy, a second network connection 66 could be made to the last device in the chain so that failure of any one device or daisy-chain connection would not affect the entire string. In operation, the internal switch can implement a standard and well-documented function known as Spanning Tree Protocol to allow redundant connections, which normally are prohibited on an Ethernet network.

FIG. 7a and FIG. 7b show alternative uses for the second Ethernet port. In FIG. 7a, the invention can connect 18 to a computer's 30 dedicated Ethernet management network connection 36. In FIG. 7b, a low-end computer such as a PC may not have a dedicated management LAN port, and security of management data is not a concern. In that situation, the Universal Computer Management Interface 60 can provide the convenience of combining its data with that from a short connection 52 to the main (user data) LAN port 37, allowing a single connection 40 to the user network 51, rather than the device and computer each having its own connection to the user network.

In all of the figures showing an Ethernet connection to a network, the administrative network 50 or user network 51 is shown as a cloud, a convention familiar to those versed in the technology. The cloud as a visual device is used to indicate that while the internal structure of the network may be complex and vary significantly from one application to another, it is not relevant to the understanding of what is otherwise being illustrated. In this case, the network cloud could be a local area network limited to one site, or a wide area network reachable from anywhere in the world, or even a single administrative computer (such as a notebook PC) directly connected, and the phrase "admin network" or "user network" should not be taken as limited to one or more specific network configurations. Similarly, a "remote" user or administrator refers only to the connection via network rather than physically attached peripherals, and whether managed computer and administrator are directly adjacent or across the continent is irrelevant.

While the initial embodiment only has two external Ethernet ports, requiring a choice between one of the uses outlined above, also contemplated are embodiments that incorporate three or more Ethernet ports. Such a version could not only implement all of those configurations concurrently, but also perform any packet processing and forwarding operation that a commercial Ethernet switch can perform. While the preferred embodiment uses a hardware Ethernet switch IC, other packet forwarding functionalities such as hubs and routers can be envisioned, as well as the potential to integrate the packet forwarding functionality into the processor's hardware or software.

Figure 8:
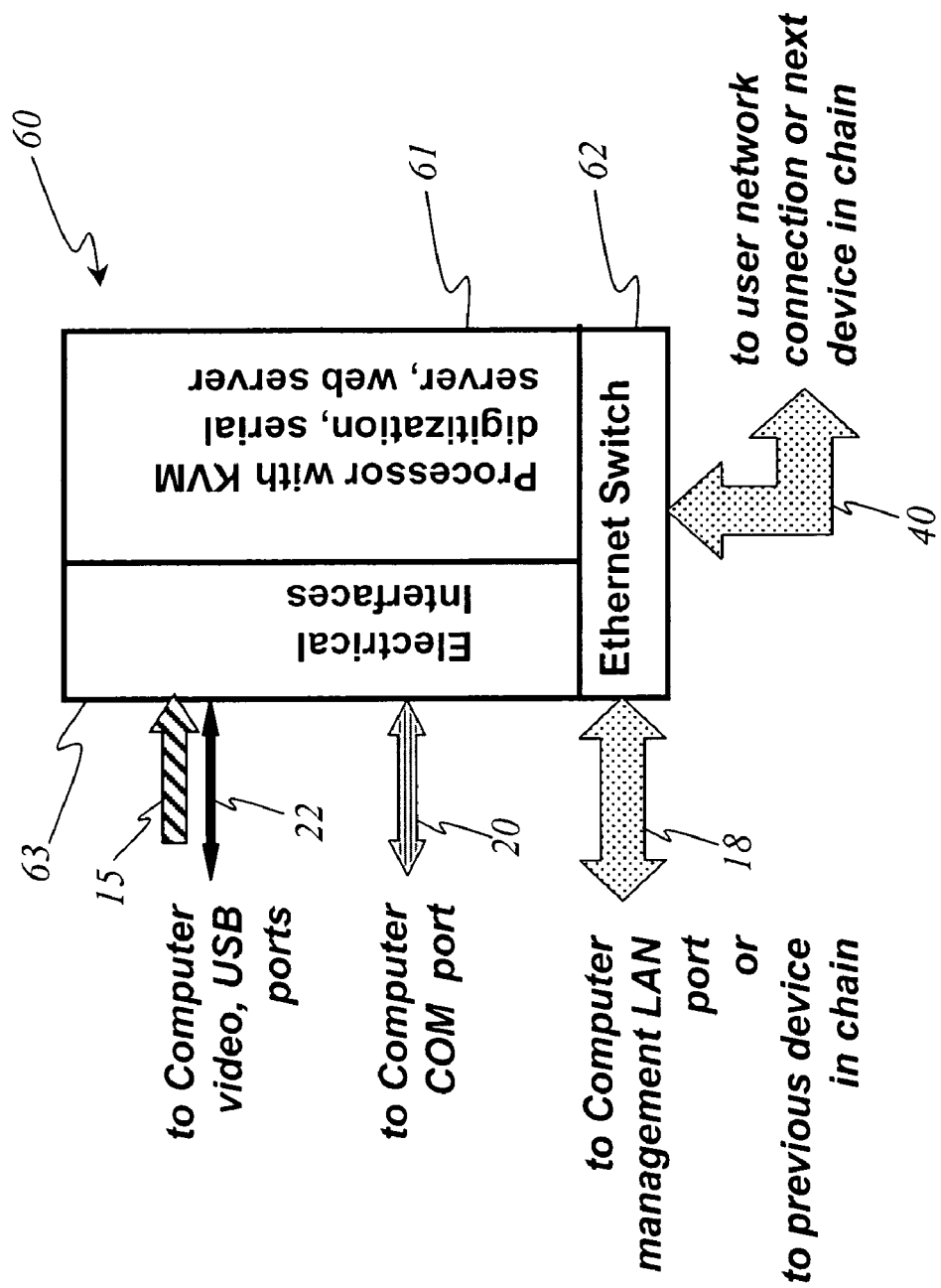
FIG. 8. is a schematic of a simple block diagram of a preferred class of Universal Computer Management Interfaces, indicating inputs and outputs.

FIG. 8 shows a simplified block diagram of the present invention 60. Various types of mixed-signal (analog and/or digital) integrated circuits comprise the electrical interface section 63. Among the myriad possible connections are video connection 15, USB connection 22, and serial COM 20 ports, and Ethernet connection 18 and 40. Among other things, the interface section 63 converts signal levels to those suitable for digital processing. A processor section 61 performs driver functions related to that received and transmitted data, such as compression of the video, keyboard and mouse emulation, and protocol conversion of the serial data. It also executes software that includes an operating system with network protocol stack, web server, serial (telnet) server, and other applications that provide network connectivity and user interface. It also may serve up Java applets or ActiveX controls, software which is downloaded to and executes on a remote client PC. An Ethernet switch section 62 connects the processor with two externally accessible Ethernet ports.

Figure 9:
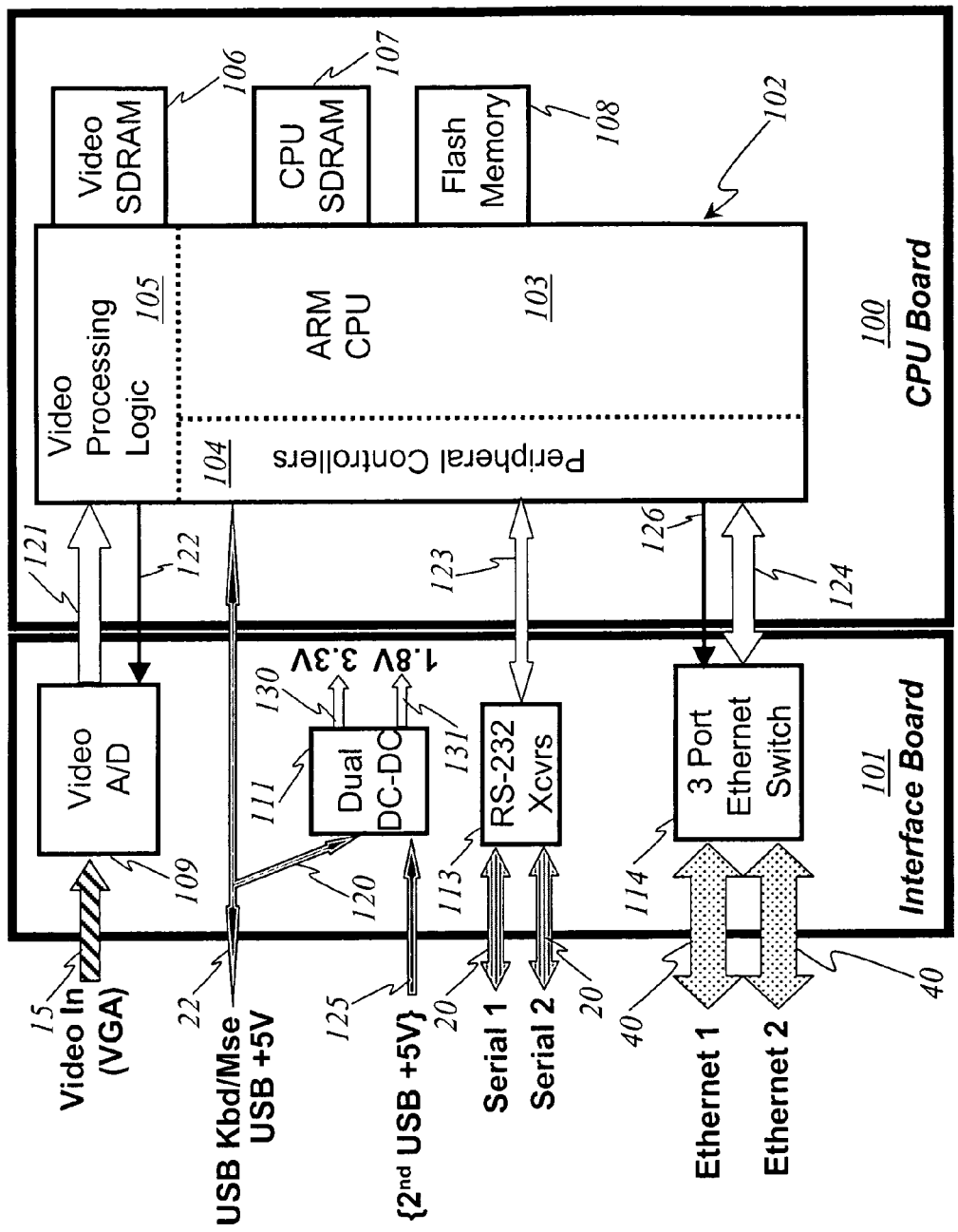
FIG. 9 is a more detailed block diagram of a preferred Universal Computer Management Interface, indicating internal elements of the device.

FIG. 9 shows a more detailed look at the preferred embodiment. In the initial embodiment, there are two printed circuit boards. The CPU board 100 contains the main processing System On Chip (SoC) 102 and memory. A peripheral interface board 101 gathers together the switch function 114 with the other hardware-specific electrical interface components. It is envisioned that various versions of the device could be produced for different computer hardware configurations by keeping the CPU board standard and just developing different peripheral interface boards and associated driver firmware, or all elements could be mounted on one circuit board.

The primary processing element in the initial implementation is a SoC named the KIRA 100, commercially available from Peppercon AG of Zwickau, Germany. A similar device (N2533A) is available from Avago Technologies (formnerly Agilent) of San Jose, Calif.; at the time of initial design the KIRA part was selected as it was more cost-effective and had better peripheral interface functionality but either device would have worked. The KIRA is based around an ARM CPU 103 linked to a peripheral controller section 104 via internal AMBA (Advanced Microcontroller Bus Architecture) APB and AHB buses (Advanced Peripheral/High-speed Bus.) The peripheral controller section has two USB controllers, two serial UARTs, and Ethernet MAC, among other functions. A third section of the SoC provides video processing 105 which encompasses a number of highly compute-intensive low-level functions that can be offloaded from the ARM CPU for improved performance. These functions include comparing video frames bit-by-bit to determine changes; compressing that change information into a particular coding format; and packetizing that information in such a way that a remote client will ultimately be able to decompress and reconstruct the video frames.

The ARM CPU in a preferred embodiment runs at 190 MHz, and includes 16 Kbyte instruction and data caches along with an SDRAM controller. The external SDRAM 107 allocated to the CPU core comprises one 8 Mb×32, 7 ns device, Micron 48LC8M32B2 or equivalent, for a total of 32 Mbytes. The CPU also accesses one 4 Mb×16 flash memory 108, AM29LV640 or equivalent, a total of 8 Mbytes. This is expandable to 16 Mbytes by using a larger capacity device.

The video processing logic accesses its own SDRAM 106, 2 Mb×32 7 ns Micron 48LC2M32B2 or equivalent for a total of 8 Mbytes. This memory is used by the video processor to store video frames and as general purpose scratchpad memory without having to contend with the ARM CPU for memory access.

The KIRA comes in a 484 pin FBGA package, 23×23 mm in outline. Peripheral I/Os utilize 3.3V while the core operates at 1.8V. Outside of the KIRA core, all other integrated circuits on both interface and CPU boards operate at 3.3 V. Power from the USB 22 is specified at 5V DC, with a maximum of 500 mA available. This is split off from the USB data and carried 120 to a dual-output DC-DC switching regulator 111. This is implemented with a Linear Technology LTC3417, a device which operates typically with 90% conversion efficiency. Taking into account the amount wasted in the conversion, a preferred embodiment requires approximately 3 watts of power from the attached computer. This is more than the 2.5 watts nominally available from a single USB connection, although many computers can provide more than the specified minimum. In order to get sufficient power under all circumstances, a second USB connection is provided 125 which thus doubles the available power to 5.0 watts. The two USB power inputs are combined together with MOSFETs, which also reduces conversion efficiency, but a minimum of 3.5 watts is available under worst case conditions. It is envisioned that as ICs consuming less power become available, the second USB connection can be eliminated in future embodiments. The outputs of the switching regulator are 1.8V 131 for the KIRA core supply, and 3.3V 130 for all other power requirements.

In a preferred embodiment, the video coming from the computer is analog VGA 15. This must be digitized in order for further processing to take place. This digitization takes place in video analog-to-digital (A/D) converter 109, an Analog Devices AD9888. This is available in speed grades up to 205 Msps, allowing digitization of 1600 pixel×1200 pixel video at 8 bits deep; for cost reasons the present invention uses lower speed grades capable of digitizing 1280×1024 or 1024×768 video. The output of the AD9888 to the video processor is 48 bits wide digital video 121, 16 bits each for Red, Green, and Blue running at half the raw video pixel rate. Control of the AD9888 comes from the KIRA via I2C bus 122; this includes initial setup and detailed sampling parameters based on scan rate recognition. Future embodiments could have a digital video input such as DVI or HDMI, which would eliminate the need for the A/D converter.

The KIRA's peripheral controllers include a complete USB host controller with transceiver level shifters, so that it may be connected directly to the USB cabling 22 to provide keyboard and mouse emulation. Firmware running on the CPU provides the needed intelligence to put together appropriate USB data streams designed to spoof the attached computer into thinking a USB keyboard and mouse are physically connected. While the combination of video input and keyboard and mouse emulations is generally known as a "KVM interface," there are environments where only monitoring of the video may be required, so the keyboard and mouse is optional. In those cases, the only function of the USB cabling would be to access power. In other contemplated embodiments, the USB keyboard and mouse connection could instead be implemented as native PS/2 keyboard and mouse interfaces. This preferably be implemented with a small microcontroller (such as an Atmel Atmega) running firmware to do the low-level PS/2 emulation, rather than burden the main CPU with "bit-banging" the clock and data lines comprising PS/2 interfaces. As mentioned, the second USB cable 125 has no data connections, and serves only as an supplementary source of power; this could also be required in the contemplated PS/2 embodiment.

A key inventive element of the Universal Computer Management Interface is the inclusion of an Ethernet packet forwarding functionality 114 which in this case is a hardware switch IC. The peripheral controller section of the KIRA includes a 10/100 Ethernet Media Access Controller coupled internally to the ARM CPU via the AHB bus and presenting a Media Independent Interface (MII) 124 outside the chip. In prior art devices using similar processors to perform some of the same functions as the present invention, the MII would be connected to an Ethernet PHY (physical layer) IC to provide the signal conditioning required to attach to the commonly used twisted-pair Ethernet network. In the present invention, instead of using a PHY which would just provide a single Ethernet port, an Ethernet switch 114 is used. The current embodiment uses a Micrel KS8993M, a full-featured 3 port managed switch. It has an MII on one port, which connects to the KIRA MII, and also incorporates two 10/100 PHYs. Computer Ethernet ports 1 and 2 40 connect to these two switch ports through transformer coupling well known to those versed in the art, and thereby can communicate either with one another or with the CPU. Setup and control of the switch can be set statically upon startup, or take place dynamically via an I2C bus 126 from the KIRA CPU.

The particular switch used has an extensive feature set including support for VLANs and management, along with provisions for implementing Spanning Tree Protocol. This flexibility allows for the various applications described above in FIGS. 6a, 6b, 7a, and 7b, such as daisy-chaining of devices, to be implemented with minimum burden on the CPU.

In other preferred embodiments, the switch function may be incorporated into future versions of the CPU eliminating the separate switch IC, or may include more than two external Ethernet ports. While a "switch" is referred to here, other elaborations of packet handling functions such as hubs or routers could be implemented in different embodiments.

Also contemplated is the use of wireless Ethernet or other current or future wireless standards for one or more of the network connections. For prior art KVM switches and similar products, wireless would have little or no benefit as there still would be the need for power cabling and connections between transceivers and switches. However, as the present invention draws its power from the attached computer and is small enough to hang behind it, wireless connectivity would bring real advantages. A hardwired Ethernet port to the computer being managed would still be present; but using a wireless administration network could eliminate the cabling between each computer and the aggregation switch for the network, along with all the associated switch ports. The entire management network physical infrastructure in large server farms could be eliminated, or (more accurately) reduced to a few wireless access points. Security, of course, would be an issue in such an installation. In addition to any network layer security functions implemented on the wireless network, the firmware in the present invention supports application layer data encryption, hence making a wireless network infrastructure a valid alternative to consider.

The RS-232 serial connection 20 to the computer's COM port or dedicated serial management port requires signal conditioning provided by an RS-232 transceiver 113. This is implemented in a preferred embodiment with a MAX3243E, which has internal charge pumps allowing it to operate on the 3.3V supply voltage and also is static-discharge protected to 15 kV. The transceiver provides logic-level serial port 123 to the UART embedded in the KIRA. Data rates up to 230 kbps are available on the RS-232 port. Another transceiver is optionally populated to provide a second serial port for control of peripherals such as a battery backup unit or power strip.

Figure 10:
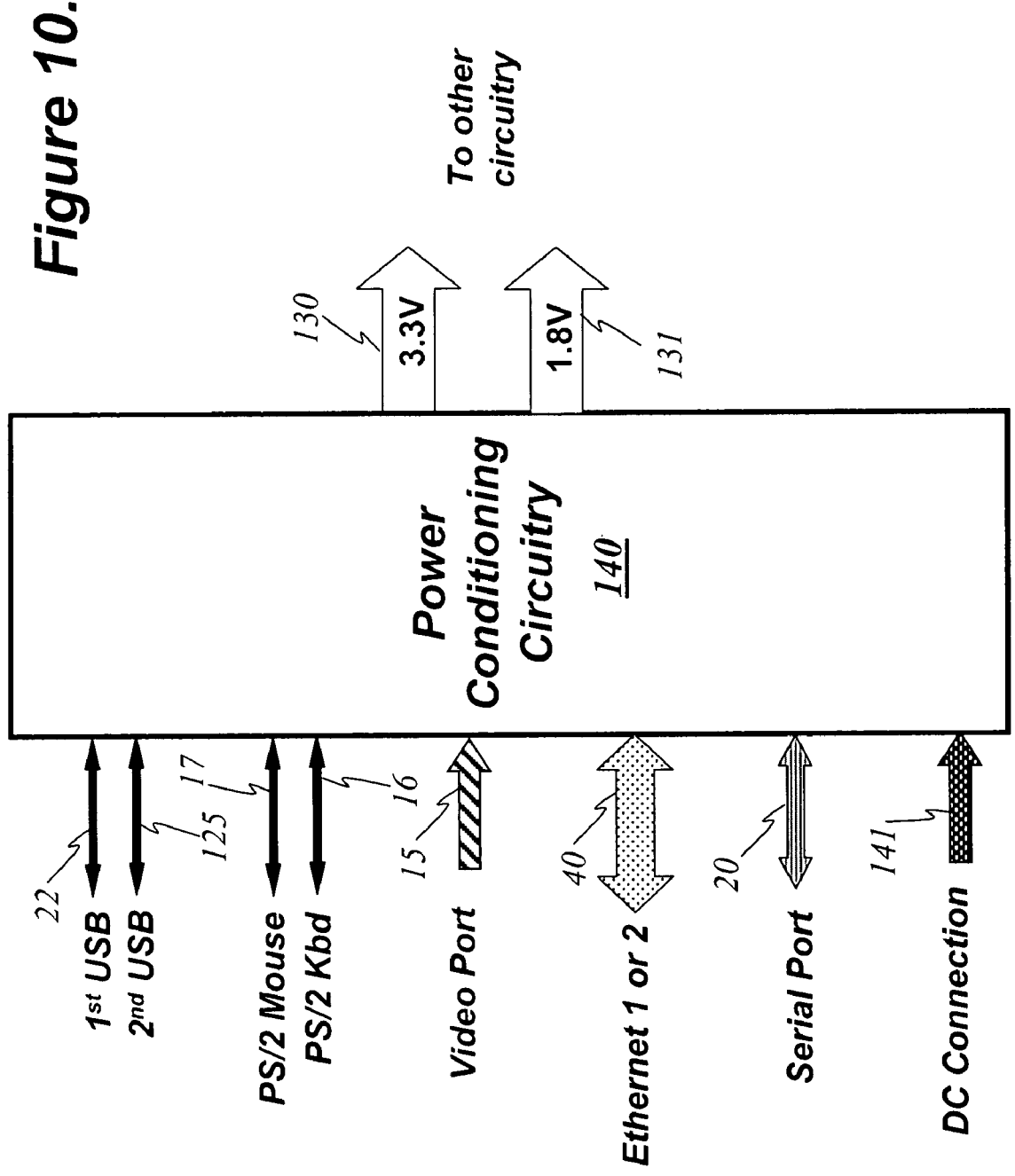
FIG. 10 is a schematic showing a power circuit portion of a preferred Universal Computer Management Interface showing multiple contemplated power sources.

FIG. 10 summarizes the various options different embodiments could have for securing power, through design of the appropriate power conditioning circuitry 140. The initial implementation uses first 22 and second 125 USB connections, each of which can provide 500 mA@5 VDC. An alternative could be to use computer PS/2 mouse 17 and keyboard 16 connections; each of those can supply 250 mA@5 VDC. The VESA standard VGA video port 15 is specified to provide at least 300 mA@5 VDC. Power Over Ethernet is a defined standard capable of supplying approximately 13 W; either or both of the device Ethernet connections 40 could be used. The serial port 20 has signals that can be called on to supply small amounts of power, possibly for a very low power future embodiment, or the port could use one or more pins to directly carry DC current in a proprietary implementation. And simplest of all, a connector could be provided for direct DC connection 141 from an external supply such as a wall-plug AC/DC converter. By using the appropriate conditioning circuitry, more than one of these inputs could be combined for additional power or for redundancy, with the ultimate result being 3.3V 130 and 1.8V 131 in the initial implementation, or whatever other voltages would be required for alternative embodiments.

While the basic KVM human interface is pretty well standardized ("look at video; make mouse movements or keystrokes in response to what you see"), a variety of different management protocols can be communicated over the serial or LAN connection depending on hardware manufacturer and operating system in place. Typical of these are the Microsoft Emergency Management Services, Intelligent Platform Management Interface (IPMI), various Linux command line console utilities, and manufacturer-specific proprietary protocols. Software running on the device's CPU provides different user interfaces from the administrative network to these protocols. Telnet or SSH provide tunneling for serial text over the network to a remote administrator. The administrator could then run a terminal emulation application (such as Hyperterminal) to communicate with the remote computer just as if the administrative computer's COM port was physically connected to the remote computer's serial port. Another piece of software running locally on the CPU can interpret IPMI data, which is formatted in a non-readable protocol, and turn it into a web page which can then be made available over the network by the device's web server software. For example, IPMI data from a sensor measuring the temperature inside of the computer can be interpreted into a picture of a dynamically changing thermometer. A remote administrator can view this page using a standard web browser, and take action. The action may be to click on a radio button on the web page labeled "power off." This button press is communicated back over the network to the device, which it then translates to the appropriate IPMI code for "turn power off" and transmits out over the serial port.

As the present invention contains a 190 MHz CPU, another contemplated element is the addition of local intelligence which can make decisions based on the data seen on the various connections to the computer. In the above example, an agent running in the device could be charged with scanning the incoming IPMI data from the serial port to monitor the computer's internal temperature. It could be preprogrammed with a rule stating that "if temperature exceeds 40 C then turn the computer off." If the set level was exceeded, the agent could send the appropriate IPMI "off" code to the serial port. It could then send an email to a preprogrammed address to notify an a human administrator (or another software agent) of the event.

Having hardware connections to all three management interfaces—serial, LAN, and KVM—with the data converging at the present invention enables the local CPU or other contemplated processing element to be programmed to implement many data processing functions not available on prior art devices. Singly or in conjunction with one another, the data streams may be filtered, translated, compressed, or otherwise altered. Security functions such as encryption or authentication could be performed on raw or processed data passing between the various logical and physical connections. And as the device contains nonvolatile memory, internal storage of data is also possible. On a higher level, software applications running on the CPU with access to all of this data can locally perform other management functions such as monitoring, asset inventorying, event logging, administrator alerting, automated recovery, information reporting, and system securing (MILARRS.) On a yet higher level, more sophisticated applications simulating the presence of human administrators could run on the local CPU, taking action based on analyzing the data available to it and utilizing a set of programmed rules or policies. The simple IPMI temperature scenario laid out above shows how translated data is monitored and, based on a rule, results in actions including automated recovery and administrator alerting. This list of data processing and information management operations contains only a few of the functions made possible by the convergence of all management information through one locally attached intelligent device, and should be read as examples and not limitations.

Thus, specific embodiments and applications of a universal computer management interface apparatus and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A device for managing a computer, comprising:
    an article of manufacture including a processing element, first and second Ethernet ports, a video port, a serial port, and an Ethernet hardware packet forwarding functionality that is operatively coupled with the first and second Ethernet ports which forwards Ethernet packets between or among a plurality of ports, regardless of whether the functionality is operating at a link layer or network layer;
    the device having a plurality of interfaces comprising any of a keyboard, mouse and video interfaces wherein the interfaces comprise at least a Universal Serial Bus (USB) connection and a video input;
    wherein the processing element is programmed to facilitate a user remotely communicatively connected to the device over the first Ethernet port to interface a computer's keyboard, video port, serial port to an administration network port and to communicate information with the computer via at least one of the second Ethernet port, the video port, and the serial port whereby the device receives power from an attached computer; and wherein the device has an internal web server that uses HTTP to present web pages derived from a digitized video input.

2. The device of claim 1 further comprising at least one of a keyboard interface and a mouse interface, which communicates with the processing element.

3. The device of claim 2 further comprising circuitry that is capable of receiving DC power from the computer over at least one of the keyboard and mouse interfaces.

4. The device of claim 2 wherein at least one of the keyboard and mouse interfaces is made via a first Universal Serial Bus (USB) connection.

5. The device of claim 1 further comprising first and second USB connections that can provide power to the device.

6. The device of claim 1 further comprising a PS/2 interface that can provide power to the device.

7. The device of claim 1 further comprising a PS/2 interface and a USB interface, each of which can provide power to the device.

8. The device of claim 1 wherein at least one of the Ethernet ports can provide power to the device.

9. The device of claim 1 wherein the video port can provide power to the device.

10. The device of claim 1 wherein the serial port can provide power to the device.

11. The device of claim 1 further comprising a DC power connector other than the Ethernet ports, the video port, and the serial port.

12. The device of claim 1 wherein the video port includes circuitry that processes analog signals.

13. The device of claim 1 wherein the video port includes circuitry that processes digital signals.

14. The device of claim 1 further including a wireless network connection operatively coupled to the Ethernet packet forwarding functionality.

15. The device of claim 1 wherein the processing element operates software that communicates with the computer using at least one of a IPMI standard protocol, a text command line protocol, a Microsoft Emergency Management Services (EMS) protocol, and a manufacturer-specific protocol.

16. The device of claim 1 further comprising a second serial port, wherein the processing element is further programmed to facilitate the user to communicate the information with the computer via the second serial port.

17. The device of claim 1 wherein the Ethernet packet forwarding functionality is implemented in an integrated circuit.

18. The device of claim 1 wherein the Ethernet packet forwarding functionality includes at least one of a switch function, a hub function and a router function.

19. The device of claim 1 further comprising a housing having a volume of less than 100 $cm^3$, which houses the article of manufacture.

20. The device of claim 1 further comprising multiple ones of the articles of manufacture.

21. A method for managing a device, the method comprising the steps of:
    providing a device within a housing that includes first and second Ethernet ports, a video port, and a serial port;
    providing a keyboard interface and a mouse interface, which communicates with a processing element; and
    remotely interfacing a computer's keyboard, video port, serial port and Ethernet port to one or more administration network ports to manage a computer by supplying any of a plurality of management functions by remotely connecting a user through the first Ethernet port, and allowing communication by the computer with a remote user via the computer's at least one of the second Ethernet port, the video port, and the serial port; whereby the device receives power from an attached computer and not an external DC connection;
    forwarding packets between or among a plurality of ports by an Ethernet hardware packet forwarding functionality located within the device, regardless of whether the functionality is operating at a link layer or network layer; and
    using HTTP to present web pages derived from a digitized video input by an internal web server located within the device.

22. The method of claim 21 further comprising including in the device an Ethernet packet forwarding functionality that is operatively coupled with the first and second Ethernet ports.

23. The method of claim 21 further comprising connecting the device to the computer through the second Ethernet port.

24. The method of claim 21 further comprising connecting the device to the computer through the video port.

25. The method of claim 21 further comprising connecting the device to the computer through the serial port.

26. The method of claim 21 further comprising providing instructions to the user for connecting the device to the computer.

27. The method of claim 21 further comprising including in the device a processing element that is programmed to execute a function selected from the list consisting of: translating, reformatting, filtering, altering, encrypting, compressing, authenticating, signing, and storing data communicated between the device and the computer.

28. The method of claim 21 further comprising including in the device a processing element that is programmed to execute a management function not native to the computer, selected from the list consisting of: monitoring computer system state, inventorying system assets, subsystems or components, logging data, alerting an administrator of system state, recovering the computer from an abnormal condition, reporting system information, and securing the computer.

29. The method of claim 28 further comprising the processing element performing at least one of the management functions locally to the device according to a set of stored rules or policies.

* * * * *